United States Patent
Kitagawa et al.

(10) Patent No.: US 11,472,384 B2
(45) Date of Patent: Oct. 18, 2022

(54) DRIVE CONTROL APPARATUS FOR DRIVE SYSTEM OF VEHICLE

(71) Applicant: DENSO CORPORATION, Kariya (JP)

(72) Inventors: Yasuhisa Kitagawa, Kariya (JP); Yoshitomo Takeuchi, Kariya (JP); Hisaaki Kobayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 626 days.

(21) Appl. No.: 16/506,719

(22) Filed: Jul. 9, 2019

(65) Prior Publication Data
US 2020/0010064 A1    Jan. 9, 2020

(30) Foreign Application Priority Data

Jul. 9, 2018 (JP) .............................. JP2018-130106

(51) Int. Cl.
| | |
|---|---|
| *B60T 8/17* | (2006.01) |
| *B60T 8/175* | (2006.01) |
| *B60W 20/00* | (2016.01) |
| *B60W 30/18* | (2012.01) |
| *B60T 8/1761* | (2006.01) |
| *B60T 8/48* | (2006.01) |

(52) U.S. Cl.
CPC .......... *B60T 8/175* (2013.01); *B60T 8/17616* (2013.01); *B60T 8/48* (2013.01); *B60W 20/00* (2013.01); *B60W 30/18172* (2013.01)

(58) Field of Classification Search
USPC ............................................... 701/70, 82–84
See application file for complete search history.

(56) References Cited

U.S. PATENT DOCUMENTS

| | | | | |
|---|---|---|---|---|
| 5,329,453 | A * | 7/1994 | Tsuyama ................... | B60T 8/48 701/84 |
| 5,636,121 | A * | 6/1997 | Tsuyama ............... | B60T 8/1755 180/197 |
| 8,078,348 | B2 * | 12/2011 | Saitoh ..................... | B60L 58/40 701/22 |
| 10,378,644 | B2 * | 8/2019 | Iwasa ...................... | F16H 59/18 |
| 2007/0063662 | A1 * | 3/2007 | Yokozutsumi ............ | B60L 3/10 318/139 |
| 2009/0101428 | A1 * | 4/2009 | Itoh ......................... | B60T 8/175 180/197 |
| 2009/0112386 | A1 * | 4/2009 | Saitoh ..................... | B60L 58/40 701/22 |

(Continued)

FOREIGN PATENT DOCUMENTS

JP            2015-90141 A         5/2015

*Primary Examiner* — Jonathan L Sample
(74) *Attorney, Agent, or Firm* — Oliff PLC

(57) ABSTRACT

A drive control apparatus is applied to a drive system that is mounted to a vehicle, drives wheels of the vehicle by a motor, and brakes the wheels by a brake apparatus. The drive control apparatus determines a road-surface state of a travel road of the vehicle. The drive control apparatus suppresses slipping of the vehicle by correcting a drive torque by correcting at least either of a motor torque and a brake torque. When determined that the drive torque is to be corrected, the drive control apparatus adjusts a correction amount of the drive torque by adjusting the motor torque with higher priority than the brake torque in response to be determined that the road-surface state is rough.

14 Claims, 9 Drawing Sheets

(56) References Cited

U.S. PATENT DOCUMENTS

| | | | |
|---|---|---|---|
| 2010/0204887 A1* | 8/2010 | Ichinose | B60L 15/2036 701/41 |
| 2013/0274980 A1* | 10/2013 | Takamura | F16D 48/066 701/67 |
| 2013/0289809 A1* | 10/2013 | Treharne | B60L 3/0046 180/65.285 |
| 2018/0290644 A1* | 10/2018 | Jang | B60K 28/16 |
| 2019/0337391 A1* | 11/2019 | Crombez | B60W 30/02 |

* cited by examiner

US 11,472,384 B2

DRIVE CONTROL APPARATUS FOR DRIVE SYSTEM OF VEHICLE

CROSS-REFERENCE TO RELATED APPLICATION

This application is based on and claims the benefit of priority from Japanese Patent Application No. 2018-130106, filed Jul. 9, 2018. The entire disclosure of the above application is incorporated herein by reference.

BACKGROUND

Technical Field

The present disclosure relates to a drive control apparatus for a drive system of a vehicle.

Related Art

In a drive control apparatus for a drive system that is mounted to a vehicle, a slip suppression technology is known that suppresses slipping of a vehicle by reducing a drive torque of the vehicle when slipping thereof is detected.

SUMMARY

The present disclosure provides a drive control apparatus for a drive system that is mounted to a vehicle, drives wheels of the vehicle by a motor, and brakes the wheels by a brake apparatus. The drive control apparatus determines a road-surface state of a travel road of the vehicle. The drive control apparatus suppresses slipping of the vehicle by correcting a drive torque that drives a drive shaft of the wheels by correcting at least either of a motor torque with which the motor drives the wheels and a brake torque with which the brake apparatus brakes the wheels. When determined that the drive torque is to be corrected, the drive control apparatus adjusts a correction amount of the drive torque by adjusting the motor torque with higher priority than the brake torque in response to it being determined that the road-surface state is rough.

DESCRIPTION OF THE EMBODIMENTS

Figure 1:
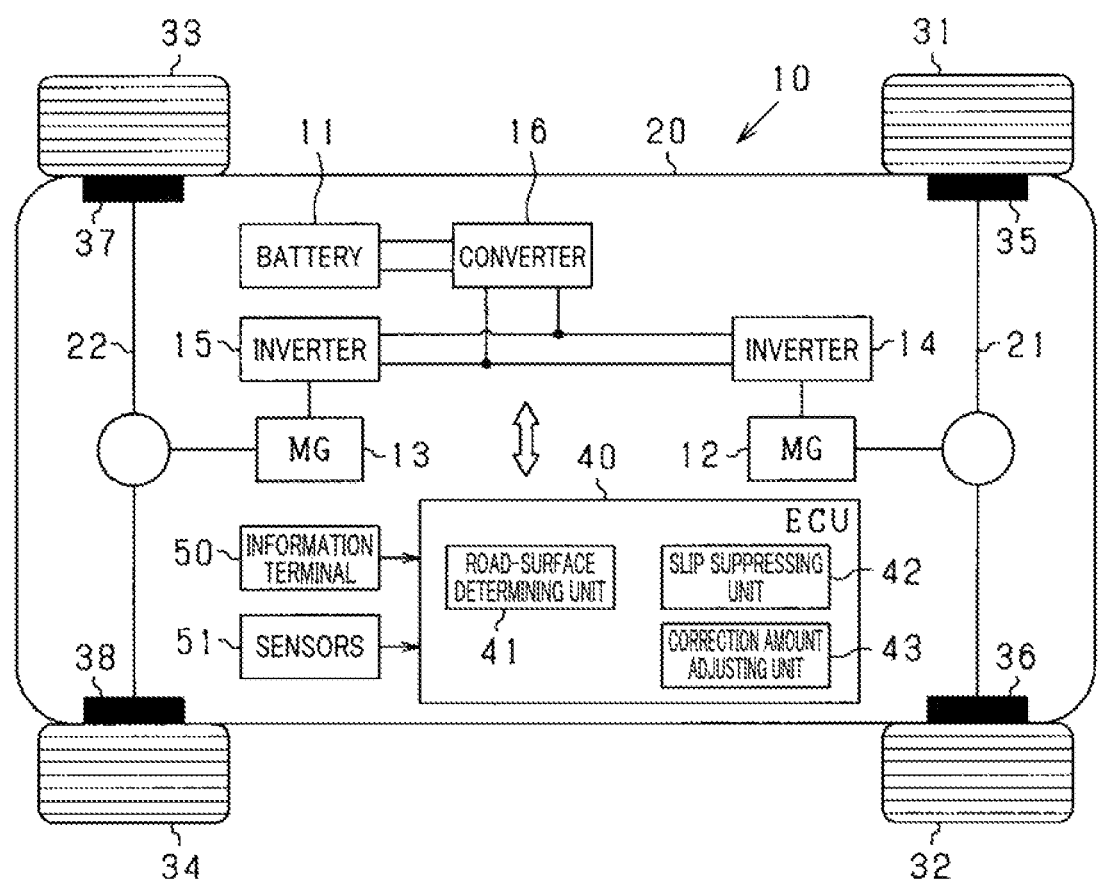
FIG. 1 is a schematic diagram of a drive system that is controlled by a drive control apparatus according to a first embodiment.

Embodiments of the present disclosure relate to a drive control apparatus that is applied to a drive system of a vehicle and is capable of suppressing slipping of a vehicle based on a road-surface state of a travel road.

A slip suppression technology is known that suppresses slipping of a vehicle by reducing a drive torque of the vehicle when slipping thereof is detected. In the slip suppression technology, when a travel road of the vehicle is rough, a detection result regarding slipping of wheels on a road surface may be exaggerated and the drive torque may be excessively reduced. As a technology for solving this issue, for example, the following related technology is known. That is, in the technology, slip suppression is performed by the drive torque being reduced through control of hydraulic brakes for the wheels. In addition, when a road-surface state of the travel road is rough, an amount of reduction of the drive torque is less than that when the road-surface state is smooth.

In the above-described related technology, the drive torque is reduced through control of only the hydraulic brakes. When responsiveness of the hydraulic brakes is insufficient, the hydraulic brakes cannot be controlled to track drive torque control. Appropriate control of the drive torque based on the road-surface state of the travel road becomes difficult.

It is thus desired to provide a drive control apparatus that is capable of performing slip suppression that is appropriate for a road-surface state of a travel road by implementing drive torque control that is capable of accurately tracking the road-surface state.

An exemplary embodiment of the present disclosure provides a drive control apparatus that is applied to a drive system that is mounted to a vehicle, drives wheels of the vehicle by a motor, and brakes the wheels by a brake apparatus. The drive control apparatus includes a road surface determining unit, a slip suppressing unit, and a correction amount adjusting unit. The road surface determining unit determines a road-surface state of a travel road of the vehicle. The slip suppressing unit suppresses slipping of the vehicle by correcting a drive torque that drives a drive shaft of the wheels by correcting at least either of a motor torque with which the motor drives the wheels and a brake torque with which the brake apparatus brakes the wheels. When the slip suppressing unit determines that the drive torque is to be corrected, the correction amount adjusting unit adjusts a correction amount of the drive torque by adjusting the motor torque with higher priority than the brake torque in response to the road surface determining unit determining that the road-surface state is rough.

In the exemplary embodiment, the slip suppressing unit suppresses slipping of the vehicle by correcting the drive torque by correcting at least either of the motor torque and the brake torque. In addition, the correction amount adjusting unit adjusts the correction amount of the drive torque corrected by the slip suppressing unit in response to the road surface determining unit determining that the road-surface state is rough. At this time, the correction amount adjusting unit performs adjustment of the motor torque with higher priority than adjustment of the brake torque. Because a correction amount of the motor torque that has high responsiveness is adjusted with higher priority, drive torque correction that is highly capable of tracking the road-surface state of the travel road can be performed. Slip suppression that is appropriate for the road-surface state can be performed.

First Embodiment

FIG. 1 shows a drive system 10 of a vehicle 20 according to a first embodiment. The drive system 10 is mounted to the vehicle 20 that is an electric car (electric vehicle [EV]). The drive system 10 is capable of driving drive shafts 21 and 22 of the vehicle 20. The drive system 10 includes a battery 11, motor generators (MGs) 12 and 13 for driving, inverters 14 and 15, a converter 16, and an electronic control unit (ECU) 40.

The battery 11 is a secondary battery. More specifically, for example, the battery 11 is a lithium-ion storage battery of which an output voltage is about 200 V to 300 V.

The first inverter 14 is connected to the first MG 12. The first inverter 14 is also connected to the battery 11 via the converter 16. The second inverter 15 is connected to the second MG 13. The second inverter 15 is also connected to the battery 11 via the converter 16. When the MGs 12 and 13 operate as power generators, the inverters 14 and 15 each convert generated alternating-current power to direct-current power. The converter 16 enables electric power to be stored in the battery 11 from the inverters 14 and 15. When the MGs 12 and 13 operate as motors, the inverters 14 and 15 can each convert direct-current power outputted from the battery 11 to alternating-current power, and respectively operate the MGs 12 and 13.

The first MG 12 is connected to the first drive shaft 21 that is arranged towards the front of the vehicle 20. Wheels 31 and 32 are connected on both sides of the first drive shaft 21. The wheels 31 and 32 are front wheels of the vehicle 20. The second MG 13 is connected to the second drive shaft 22 that is arranged towards the rear of the vehicle 20. Wheels 33 and 34 are connected to both ends of the second drive shaft 22. The wheels 33 and 34 are rear wheels of the vehicle 20.

When operating as the power generators, the MGs 12 and 13 convert rotational energy of the wheels 31 to 34 to electric power. When operating as the motors, the MGs 12 and 13 convert electric power supplied from the battery 11 to rotational energy, and respectively drive the drive shafts 21 and 22.

Brake apparatuses 35 to 38 are respectively set in the wheels 31 to 34. The brake apparatuses 35 to 38 are hydraulic brakes. The brake apparatuses 35 to 38 can brake the corresponding wheels 31 to 34 by generating brake torque by applying braking pressure to the wheels 31 to 34.

An information terminal 50 acquires information that is inputted from outside the vehicle 20 or a traveling assistance apparatus. The information terminal 50 then outputs the information to the ECU 40. Sensors 51 are conventional, publicly known sensors that are capable of detecting a state of the vehicle 20 and a state surrounding the vehicle 20. Specifically, examples of the sensor 51 include a vehicle-body speed sensor (vehicle speed sensor), a wheel speed sensor, a torque sensor, an accelerator sensor, a camera sensor, and a radar sensor.

The ECU 40 is a drive control apparatus that controls constituent elements of the drive system 10, such as the battery 11, the MGs 12 and 13, and the inverters 14 and 15. The ECU 40 can acquire information from the information terminal 50 and the sensors 51 that are mounted to the vehicle 20, and output control signals to the battery 11, the MGs 12 and 13, the inverters 14 and 15, and the like.

The ECU 40 is mainly configured by a microcomputer that is composed of a central processing unit (CPU), a read-only memory (ROM), a random access memory (RAM), a backup RAM, an input/output (I/O), and the like (not shown). The ECU 40 is capable of actualizing functions described in the present specification by running various control programs stored in the ROM. The ECU 40 includes a road surface determining unit 41, a slip suppressing unit 42, and a correction amount adjusting unit 43.

The road surface determining unit 41 determines a road-surface state of a travel road of the vehicle 20. The road surface determining unit 41 may also be configured to further determine a degree of roughness when determined that the road-surface state is rough.

The road-surface state may be determined based on various parameters of the vehicle 20 that is traveling. Alternatively, the road-surface state may be determined based on information on an actual road-surface state. For example, the road-surface state can be determined based on various parameters of the vehicle 20, such as a variation in an accelerator pedal position, a suspension displacement amount, and a high-frequency component of a steering angle. In addition, for example, the road-surface state can be determined based on information related to the road-surface state that is acquired from the information terminal 50 and the sensors 51.

A specific example will be described. For example, the road surface determining unit 41 may be configured to respectively set rough-road indexes g1 to g4 based on a period of variation in the acceleration of a wheel speed VR that is calculated based on rotation speeds of the wheels 31 to 34. The road surface determining unit 41 may then determine that the road-surface state is rough when a combined rough-road index G is equal to or greater than a predetermined rough-road determination value X1.

The combined rough-road index G is a combination of the rough-road indexes g1 to g4. Here, the values of the rough-road indexes g1 to g4 and the combined rough-road index G are set to greater values as the period of variation in the acceleration of the wheel speed VR becomes shorter. The degree of roughness of the road-surface state increases as the values of rough-road indexes g1 to g4 and the combined rough-road index G increase.

The slip suppressing unit 42 determines whether or not slip suppression is to be performed based on a slip rate Sn of the vehicle 20. For example, the slip suppressing unit 42 may determine that a slip suppression process is to be performed when the slip rate Sn is equal to or greater than a predetermined slip determination value Y1. The slip determination value Y1 may be adjusted based on the road-surface state and the like.

The slip rate Sn can be calculated by expression (1), below, based on the wheel speed VR that is calculated based on the rotation speeds of the wheels 31 to 34 and the vehicle-body speed VC of the vehicle 20. Here, for example, the vehicle-body speed VC can be calculated based on a detection value of a speed sensor that is mounted to the vehicle 20. For example, the wheel speed VR can be calculated based on control signals outputted to the MGs 12 and 13.

In addition, in expression (1), below, max(VC,VR,a) indicates the greater of the vehicle-body speed VC and the wheel speed VR. Constant a is a constant for preventing a denominator from becoming 0 when VC=VR=0. The constant a is a small constant that is less than 1.

$$Sn\ [\%] = (VR - VC)/\max(VC, VR, a) \quad (1)$$

The slip suppressing unit 42 suppresses slipping of the vehicle 20 by correcting a drive torque T that drives the drive shafts 21 and 22 of the wheels 31 to 34. The slip suppressing unit 42 can correct the drive torque T by correcting at least either of a brake torque TB when the brake apparatuses 35 to 38 brake the drive shafts 21 and 22, and a motor torque TM when the MGs 12 and 13 drive the drive shafts 21 and 22. Here, when a torque element other than the motor torque TM and the brake torque TB is included as torque elements that affect the drive torque T, the other torque element may be corrected when the drive torque T is corrected.

In the drive system 10, as shown in expression (2), below, the drive torque T can be calculated as a sum of a product of a gear ratio kB and the brake torque TB, and a product of a gear ratio kM and the motor torque TM. Here, the gear ratio kB is a gear ratio of the drive shafts 21 and 22 in relation to the brake apparatuses 35 to 38. The gear ratio kM is a gear ratio of the drive shafts 21 and 22 in relation to the MGs 12 and 13. The drive torque T can be controlled by the brake torque TM or the motor torque TM being adjusted. Here, the brake torque TM is a negative torque and the motor torque TM is a positive torque.

$$T = kB \times TB + kM \times TM \qquad (2)$$

The slip suppressing unit 42 calculates a correction amount T1 of the drive torque T that is required to suppress slipping of the vehicle 20. As shown in expression (3), below, the slip suppressing unit 42 calculates a correction amount TB1 of the brake torque TB and a correction amount TM1 of the motor torque TM such as to meet the correction amount T1.

The slip suppressing unit 42 can set the correction amount TB1 and the correction amount TM1 as appropriate based on a traveling state of the vehicle 20 and operation states of the MGs 12 and 13. Here, in the present specification, the correction amount of each torque is described an amount of reduction. That is, during slip suppression, the drive torque T is reduced to T−T1, where T1>0. The brake torque TB is corrected to TB−TB1, and TB1≥0. The motor torque TM is corrected to TM−TM1, and TM1≥0.

$$T1 = kB \times TB1 + kM \times TM1 \qquad (3)$$

Figure 2:
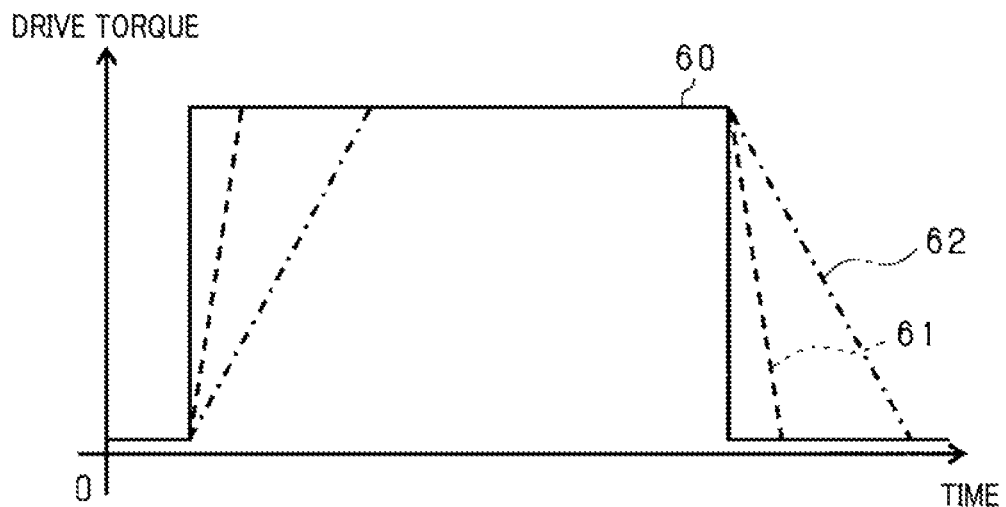
FIG. 2 is a diagram of responsiveness of motor torque and brake torque to a control signal.

As shown in FIG. 2, the motor torque TM is superior to the brake torque TB in terms of responsiveness. Therefore, when the motor torque TM is changed in response to a step-like torque command signal 60 for the drive torque T, the motor torque TM changes as shown by a broken line that is denoted by reference number 61. When the brake torque TB is changed, the brake torque TB changes as shown by a single-dot chain line that is denoted by reference number 62.

As indicated by reference numbers 61 and 62, when a command value of the torque command signal 60 is changed, the motor torque TM requires a shorter amount of time to converge at the command value after the change, compared to the brake torque TB. That is, the motor torque TM is superior in tracking a torque command that changes the torque value, compared to the brake torque TB. Therefore, when correcting the drive torque T, the slip suppressing unit 42 preferably corrects the motor torque TM with higher priority than the brake torque TB. As a result of control being performed in this manner, the drive torque T can be promptly changed based on the torque command.

The slip suppressing unit 42 may be configured to correct only the motor torque TM. That is, the correction amount TB1 of the brake torque TB may be set to 0 (TB1=0). As shown in FIG. 2, because the motor torque TM has high responsiveness, the drive torque T can be promptly controlled during switching between execution and non-execution of slip suppression. In addition, the slip suppressing unit 42 may be configured to correct only the brake torque TB. As shown in FIG. 2, correcting and changing only the motor torque TM as indicated by reference number 61, and correcting and changing only the brake torque TB as indicated by reference number 62 based on the change in the torque command signal 60 are possible.

The slip suppressing unit 42 may be configured to adjust the slip determination value Y1 based on the torque to be corrected. For example, when the brake torque TB is to be corrected, a determination value YB may be used as the slip determination value Y1. When the motor torque TM is to be corrected, a determination value YM may be used as the slip determination value Y1. The motor torque TM is superior to the brake torque TB in terms of responsiveness. Therefore, the slip determination value Y1 is preferably set to be higher when the motor torque TM is to be corrected, compared to that when the brake torque TB is to be corrected. That is, the determination value YM is preferably greater than the determination value YB (YM>YB).

The correction amount adjusting unit 43 adjusts the correction amount T1 of the drive torque T to be corrected by the slip suppressing unit 42 to a correction amount T2, based on the road-surface state that is determined by the road surface determining unit 41. As shown in expression (4), below, the correction amount adjusting unit 43 calculates a correction amount TB2 of the brake torque TB and a correction amount TM2 of the motor torque TM such as to meet the correction amount T2.

$$T2 = kB \times TB2 + kM \times TM2 \qquad (4)$$

The adjustment of the correction amount T1 and the like by the correction amount adjusting unit 43 is performed to suppress excessive reduction of the drive torque T as a result of the detection results of the drive shafts 21 and 22 regarding slipping on the road surface being exaggerated, when the travel road of the vehicle 20 is a rough road. Therefore, when the road surface determining unit 41 determines that the road-surface state is rough, the correction amount adjusting unit 43 adjusts the correction amount T1 to the correction amount T2 such that the drive torque after the correction increases. That is, the correction amount T2 is less than the correction amount T1 (T2<T1).

When the road-surface state is determined to be rough during slip suppression, the drive torque T is reduced to T−T2, and T1>T2>T0. The brake torque TB is corrected to TB−TB2, and TB1≥TB2≥0. The motor torque TM is corrected to TM−TM2, and TM1≥TM2≥0. In addition, when the road surface determining unit 41 determines that the road-surface state is smooth, the correction amount adjusting unit 43 does not reduce the correction amount T1 of the drive torque T.

When the road surface determining unit 41 determines the degree of roughness of the road-surface state, the correction amount adjusting unit 43 may be configured to adjust the correction amount T1 of the drive torque T based on the degree of roughness. For example, the correction amount adjusting unit 43 may set the correction amount T2 to be less than the correction amount T1 as the rough-road indexes g1 to g4 and the combined rough-road index G calculated based on the period of variation in the acceleration of the wheel speed VR of the wheels 31 to 34 increases. When the correction amount T2 of the drive torque T is adjusted based on the degree of roughness, the correction amount TM2 of the motor torque TM and the correction amount TB2 of the brake torque TB may also be changed based on the degree of roughness.

When adjusting the correction amount T1 to the correction amount T2, the correction amount adjusting unit 43 may adjust both the correction amount TM1 of the motor torque TM and the correction amount TB1 of the brake torque TB. Alternatively the correction amount adjusting unit 43 may adjust either of the correction amount TM1 of the motor torque TM and the correction amount TB1 of the brake torque TB. However, the correction amount adjusting unit 43 preferably adjusts the motor torque TM with higher priority than the brake torque TB.

That is, the correction amount adjusting unit 43 preferably adjusts only the correction amount of the motor torque TM in cases in which the correction amount of the drive torque T can be adjusted by only the correction amount of the motor torque TM being adjusted. In addition, the correction amount adjusting unit 43 preferably adjusts the correction amount of the brake torque TB and the like in cases in which the correction amount of the drive torque T cannot be adjusted by only the correction amount of the motor torque TM being adjusted. As shown in FIG. 2, the motor torque TM has high responsiveness. Therefore, the drive torque T can be appropriately controlled such as to track the changes in the road-surface state.

Furthermore, when the outputs of the MGs 12 and 13 are restricted, the correction amount adjusting unit 43 may adjust the correction amount TB1 of the brake torque TB to the correction amount TB2. When the outputs of the MGs 12 and 13 are not restricted, the correction amount adjusting unit 43 may not adjust the correction amount TB1 of the brake torque TB.

More specifically, in cases in which the outputs of the MGs 12 and 13 are restricted and the correction amount T1 of the drive torque T cannot be adjusted to the correction amount T2 by only the correction amount TM1 of the motor torque TM being adjusted to the correction amount TM2, the correction amount adjusting unit 43 may compensate for the insufficient amount by adjusting the correction amount of the brake torque TB. Here, for example, whether or not the outputs of the MGs 12 and 13 are restricted may be determined based on a temperature and a state-of-charge (SOC) of the battery 11, and temperatures of the MGs 12 and 13.

When a determination that the vehicle 20 will accelerate is made, the correction amount adjusting unit 43 may adjust the correction amount T1 of the drive torque T to the correction amount T2. When a prediction that the vehicle 20 will not accelerate is made, the correction amount adjusting unit 43 may not adjust the correction amount T1 of the drive torque. Whether or not the vehicle 20 will accelerate can be determined based on an operating state of the vehicle 20 by a driver, a driving state of the vehicle 20, and the state surrounding the vehicle 20.

Specifically, for example, whether or not the driver intends to accelerate can be determined based on the accelerator pedal position of the vehicle 20. In addition, for example, whether or not acceleration of the vehicle 20 is permitted in terms of safety can be determined based on a distance between the own vehicle 20 and a leading vehicle thereof. As a result of the correction amount adjusting unit 43 being configured in this manner, the driver experiencing discomfort can be suppressed and safe traveling can be ensured.

The slip suppressing unit 42 and the correction amount adjusting unit 43 may separately calculate the correction amounts for the drive torque of the wheels 31 and 32 that are the front wheels and the drive torque of the wheels 33 and 34 that are the rear wheels. Alternatively, the slip suppressing unit 42 and the correction amount adjusting unit 43 may collectively calculate the correction amounts.

Figure 3:
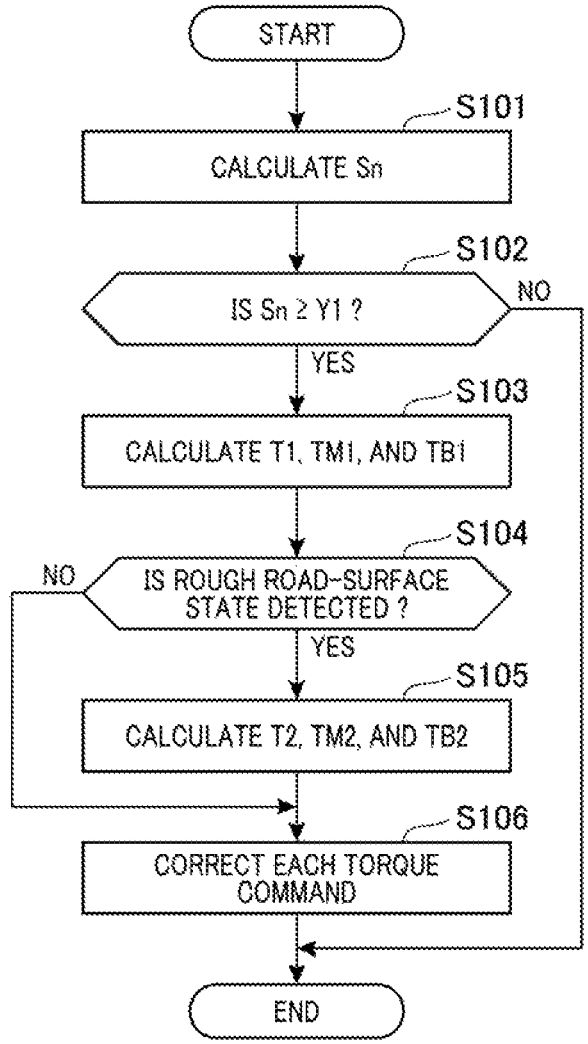
FIG. 3 is a flowchart of a drive control process according to the first embodiment.

FIG. 3 shows a flowchart of the drive control process performed by the ECU 40.

First, at step S101, the ECU 40 acquires the wheel speed VR, the vehicle-body speed VC, and the like from the sensors 51. The ECU 40 then calculates the slip rate Sn. Subsequently the ECU 40 proceeds to step S102.

At step S102, the ECU 40 compares the slip rate Sn and the slip determination value Y1. When determined that Sn≥Y1, the ECU 40 proceeds to step S103. When determined that Sn<Y1, the ECU 40 ends the process.

At step S103, the ECU 40 calculates the correction amount T1 of the drive torque T. The ECU 40 also calculates the correction amount TM1 of the motor torque TM and the correction amount TB1 of the brake torque TB based on expression (3), above. At this time, the ECU 40 corrects the motor torque TM with higher priority than the brake torque TB. For example, when the correction amount T1 can be secured by only the correction amount TM1, the ECU 40 sets T1=k×TM1. In addition, for example, when the correction amount T1 cannot be secured by the correction amount TM1 allowed for the MGs 12 and 13, the ECU 40 compensates for the insufficient amount by the correction amount TB1. Subsequently, the ECU 40 proceeds to step S104.

At step S104, the ECU 40 determines whether the road-surface state is rough or smooth. Specifically, the ECU 40 sets the rough-road indexes g1 to g4 based on the period of variation in the acceleration of the wheel speed VR calculated based on the rotation speeds of the wheels 31 to 34. The ECU 40 determines that the road-surface state is rough when the combined rough-road index G that is the combination of the rough-road indexes g1 to g4 is equal to or greater than the rough-road determination value X1. When determined that the road-surface state is rough, the ECU 40 proceeds to step S105. When determined that the road-surface state is smooth, the ECU 40 proceeds to step S106.

At step S105, the ECU 40 calculates the correction amount T2 of the drive torque T. The ECU 40 also calculates the correction amount TM2 of the motor torque TM and the correction amount TB2 of the brake torque TB based on expression (4), above. At this time, the ECU 40 adjusts the correction amount TM1 of the motor torque TM with higher priority than the correction amount TB1 of the brake torque TB. For example, when the correction amount T1 can be adjusted to the correction amount T2 by only the correction amount TM1 being adjusted to the correction amount TM2, the ECU 40 sets the correction amount TB2 to the correction amount TB1 (TB2=TB1), without adjusting the correction amount TB1. Subsequently, the ECU 40 proceeds to step S106.

At step S106, the ECU 40 corrects the torque commands of the drive torque T, the motor torque TM, and the brake torque TB based on the calculated correction amounts. When determined that the slip rate Sn is equal to or greater than the slip determination value Y1 at step S102 and determined that the road-surface state is not rough at step S104, the ECU 40 corrects each torque command based on the correction amounts T1, TM1, and TB1 calculated at step S103, and corrects the drive torque T to T−T1.

When determined that the slip rate Sn is equal to or greater than the slip determination value Y1 at step S102 and determined that the road-surface state is rough at step S104, the ECU 40 corrects each torque command based on the correction amounts T2, TM2, and TB2 calculated at step S105, and corrects the drive torque T to T−T2. The ECU 40 ends the process after step S106. When the drive torques T after correction are compared, T−T1<T−T2. The drive torque during slip suppression is increased from T−T1 to T−T2, taking into consideration the slip rate Sn becoming excessively large and the drive torque T being reduced by a greater extent than required when the road is in a rough state.

Figure 4:
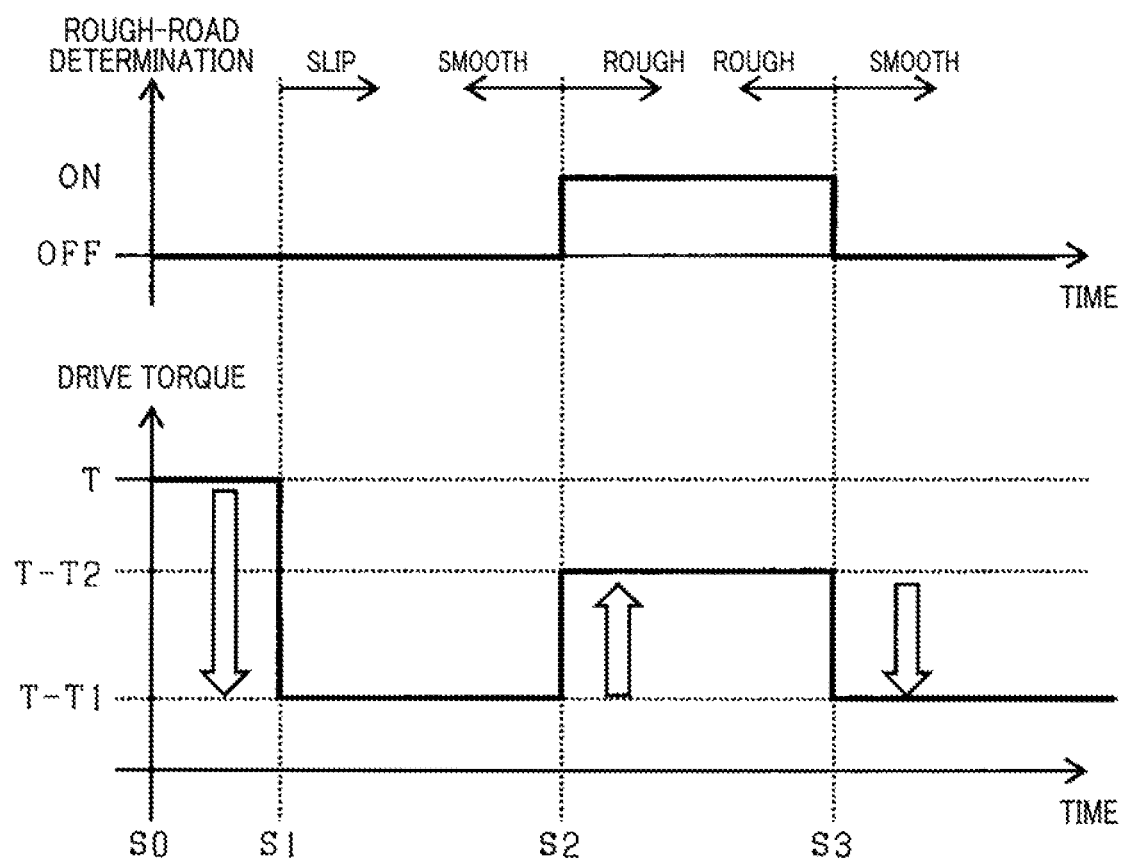
FIG. 4 is a timing chart of drive control according to the first embodiment.

FIG. 4 shows a time chart of the drive control process related to the flowchart in FIG. 3. In FIG. 4, a horizontal axis indicates time. A vertical axis indicates whether or not a rough-road flag is set (flag ON when the road is determined to be in a rough state and flag OFF when the road is not determined to be in a rough state), and the drive torque T, in this order from the top.

At time s0 to s1, the slip rate Sn is less than Y1. Therefore, slip suppression is not performed. The drive torque is T.

At time s1, the slip rate Sn becomes equal to or greater than Y1 (Sn≥Y1). The determination regarding whether or not the road-surface state is rough is started. At time s1 to s2, because the slip rate Sn≥Y1 and the road-surface state is determined to be smooth, the drive torque T is corrected by slip suppression. However, adjustment of the correction amount T1 is not performed and the drive torque T is reduced to T−T1. At time s1 to s2, TM1>0 and TB2<0. The motor torque TM and the brake torque TB are both corrected.

At time s2, the determination of the road-surface state changes from smooth to rough, and the rough-road flag is switched from OFF to ON. At time s2 to s3, because the slip rate Sn≥Y1 and the road-surface state is determined to be rough (rough-road flag ON), slip suppression is performed. The drive torque T is corrected to T−T1. Furthermore, the correction amount T1 is adjusted to the correction amount T2.

The correction amount TM1 of the motor torque TM is adjusted with higher priority, and the drive torque T is corrected to T−T2. The drive torque (T−T2) at time s2 to s3 has decreased from the drive torque T at time s0 to s2 during which slip suppression is not performed. However, the drive torque (T−T2) at time s2 to s3 has increased from the drive torque (T−T1) at time s1 to s2 at which the road-surface state is determined to be rough during slip suppression. That is, T−T1<T−T2<T, and T1>T2.

As described above, according to the present embodiment, when the slip suppressing unit 42 corrects the drive torque T, the correction amount adjusting unit 43 reduces the correction amount T1 of the drive torque T to T2 in response to the road-surface determining unit 41 determining that the road-surface state is rough. Regarding the correction of the drive torque T, the correction of the motor torque TM that has high responsiveness is performed with higher priority. Therefore, a highly accurate slip suppression that is capable of promptly responding to the road-surface state can be performed.

Second Embodiment

Figure 5:
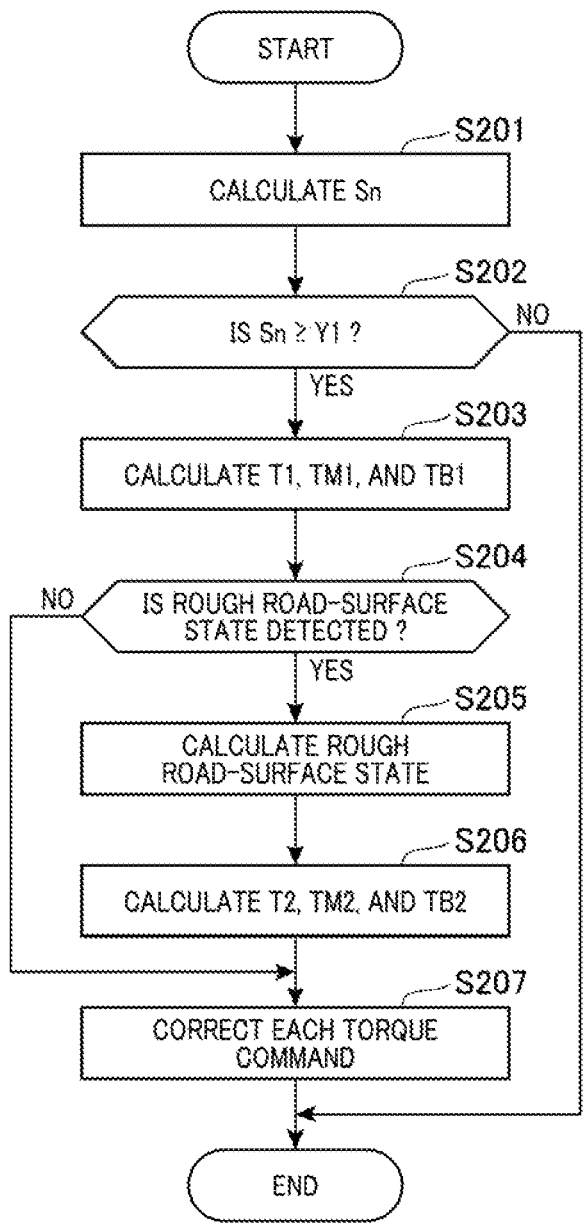
FIG. 5 is a flowchart of a drive control process according to a second embodiment.

FIG. 5 shows a flowchart of the drive control process according to a second embodiment. The processes at steps S201 to S204 shown in FIG. 5 are similar to those at steps S101 to S104 shown in FIG. 3. Therefore, descriptions thereof are omitted.

When determined that the road-surface state is rough at step S204, the ECU 40 proceeds to step S205. At step S205, the ECU 40 determines the degree of roughness of the road-surface state. Specifically, for example, when the rough-road indexes g1 to g4 are calculated based on the period of variation in the acceleration of the wheel speed VR of the wheels 31 to 34 at step S204, and the combined rough-road index G that is the combination of the rough-road indexes g1 to g4 is further calculated, the combined rough-road index G can be used as a calculation value for a rough road-surface state. After step S205, the ECU 40 proceeds to step S207. Meanwhile, when determined that the road-surface state is smooth at step S204, the ECU 40 proceeds to step S207.

At step S206, the ECU 40 calculates the correction amount T2 of the drive torque T based on the degree of roughness calculated at step S205. The ECU 40 also calculates the correction amount TM2 of the motor torque TM and the correction amount TB2 of the brake torque TB based on expression (4), above.

The degree of roughness increases as the value of the combined rough-road index G increases. Therefore, T1−T2 that is a difference between the correction amounts T1 and T2 increases as the combined rough-road index G increases. In a manner similar to that at step S105, at this time, the ECU 40 adjusts the correction amount TM1 of the motor torque TM with higher priority than the correction amount TB1 of the brake torque TB. Subsequently, the ECU 40 proceeds to step S207.

At step S207, the ECU 40 corrects the torque commands of the drive torque T, the motor torque TM, and the brake torque TB based on the calculated correction amounts. When determined that the slip rate Sn is equal to or greater than the slip determination value Y1 at step S202 and determined that the road-surface state is not rough at step S204, the ECU 40 corrects each torque command based on the correction amounts T1, TM1, and TB1 calculated at step S203 and corrects the drive torque T to T−T1.

When determined that the slip rate Sn is equal to or greater than the slip determination value Y1 at step S202 and determined that the road-surface state is rough at step S204, the ECU 40 corrects each torque command based on the correction amounts T2, TM2, and TB2 calculated at step S206 and corrects the drive torque T to T−T2. The ECU 40 ends the process after step S207.

As described above, according to the present embodiment, when the road-surface state is determined to be rough, the degree of roughness is calculated. The correction amount adjusting unit 43 adjusts the correction amount T2 of the drive torque T based on the calculated degree of roughness. A more appropriate correction amount T2 can be calculated based on the degree of roughness.

Therefore, a highly accurate slip suppression that is more appropriate for the road-surface state can be performed. In addition, regarding the correction of the drive torque T, the correction of the motor torque TM that has high responsiveness is performed with higher priority. Therefore, control in which the correction amount T2 is changed based on the degree of roughness with relatively high frequency can be performed.

Third Embodiment

Figure 6:
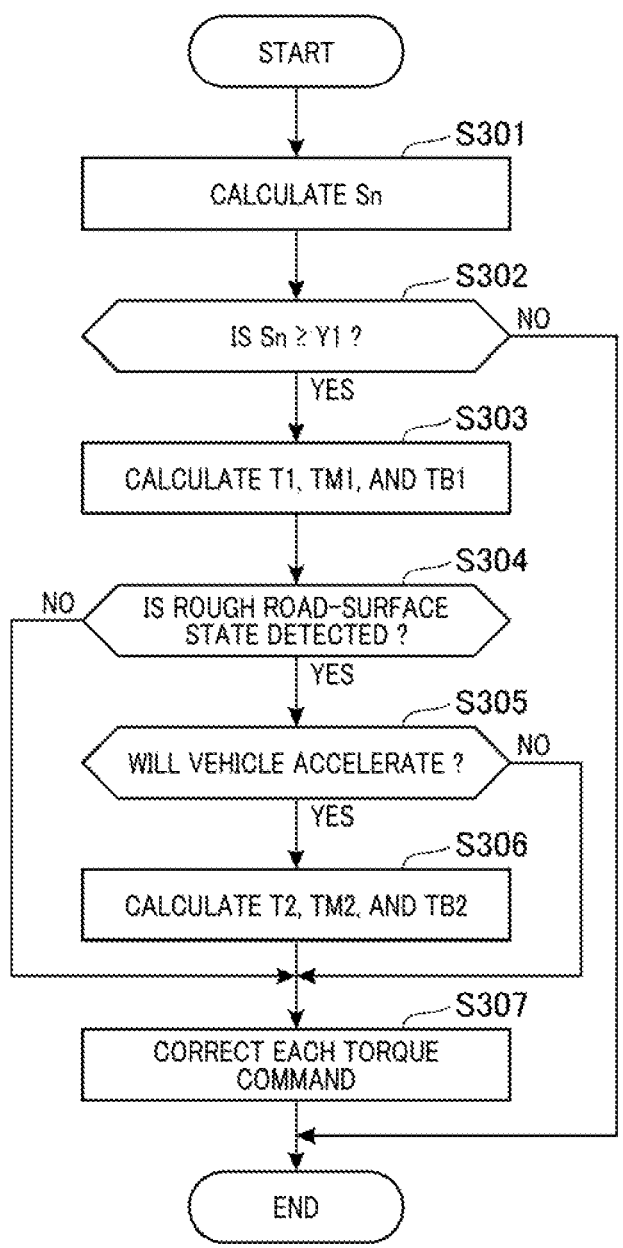
FIG. 6 is a flowchart of a drive control process according to a third embodiment.

FIG. 6 shows a flowchart of the drive control process according to a third embodiment. The processes at steps S301 to S304 shown in FIG. 6 are similar to those at steps S101 to S104 shown in FIG. 3. Therefore, descriptions thereof are omitted. In addition, the processes at steps S306 and S307 are respectively similar to those at steps S105 and S106 shown in FIG. 3. Therefore, descriptions thereof are omitted.

When determined that the road-surface state is rough at step S304, the ECU 4 proceeds to step S305. Meanwhile, when determined that the road-surface state is smooth at step S304, the ECU 40 proceeds to step S307.

At step S305, the ECU 40 determines whether or not the vehicle 20 will accelerate. Whether or not the vehicle 20 will accelerate can be determined based on the operating state of the vehicle 20 by the driver, the driving state of the vehicle 20, and the state surrounding the vehicle 20.

Specifically, for example, the accelerator pedal position being equal to or less than a predetermined accelerator pedal position indicates that the driver has no intention to accelerate. The ECU 40 can determine that the vehicle 20 will not accelerate. Meanwhile, the accelerator pedal position being greater than the predetermined accelerator pedal position indicates that the driver intends to accelerate. The ECU 40 can determine that the vehicle 20 will accelerate.

In addition, for example, when the distance between the vehicle 20 and the leading vehicle thereof is short, accelerating the vehicle 20 is dangerous. Therefore, the ECU 40 can determine that the vehicle 20 will not accelerate. When determined that the vehicle 20 will not accelerate at step S305, the ECU 40 proceeds to step S307. Meanwhile, when determined that the vehicle 20 will accelerate at step S305, the ECU 40 proceeds to step S306.

At step S306, in a manner similar to that at step S105, the ECU 40 calculates the correction amount T2 of the drive torque T. The ECU 40 also calculates the correction amount TM2 of the motor torque TM and the correction amount TB2 of the brake torque TB based on expression (4), above. At this time, the ECU 40 adjusts the correction amount TM1 of the motor torque TM with higher priority than the correction amount TB1 of the brake torque TB. Subsequently, the ECU 40 proceeds to step S307.

At step S307, the ECU 40 corrects the torque commands of the drive torque T, the motor torque TM, and the brake torque TB based on the calculated correction amounts. Even when determined that the slip rate Sn is equal to or greater than the slip determination value Y1 at step S302 and determined that the road-surface state is rough at step S304, when determined that the vehicle 20 will not accelerate at step S305, the ECU 40 does not adjust the correction amount T1. That is, the ECU 40 corrects the torque commands based on the correction amounts T1, TM1, and TB1, and corrects the drive torque T to T−T1.

As described above, according to the present embodiment, when the determination that the vehicle 20 will not accelerate is made, such as when the driver does not want the vehicle 20 to accelerate, the correction of the drive torque T can not be performed. As a result, acceleration of the vehicle 20 against the intention of the driver can be suppressed. Discomfort experienced by the driver can be suppressed. In addition, the vehicle 20 being accelerated under circumstances in which acceleration is dangerous, such as when the distance to the leading vehicle is short, can be suppressed. Safe traveling can be ensured.

Fourth Embodiment

Figure 7:
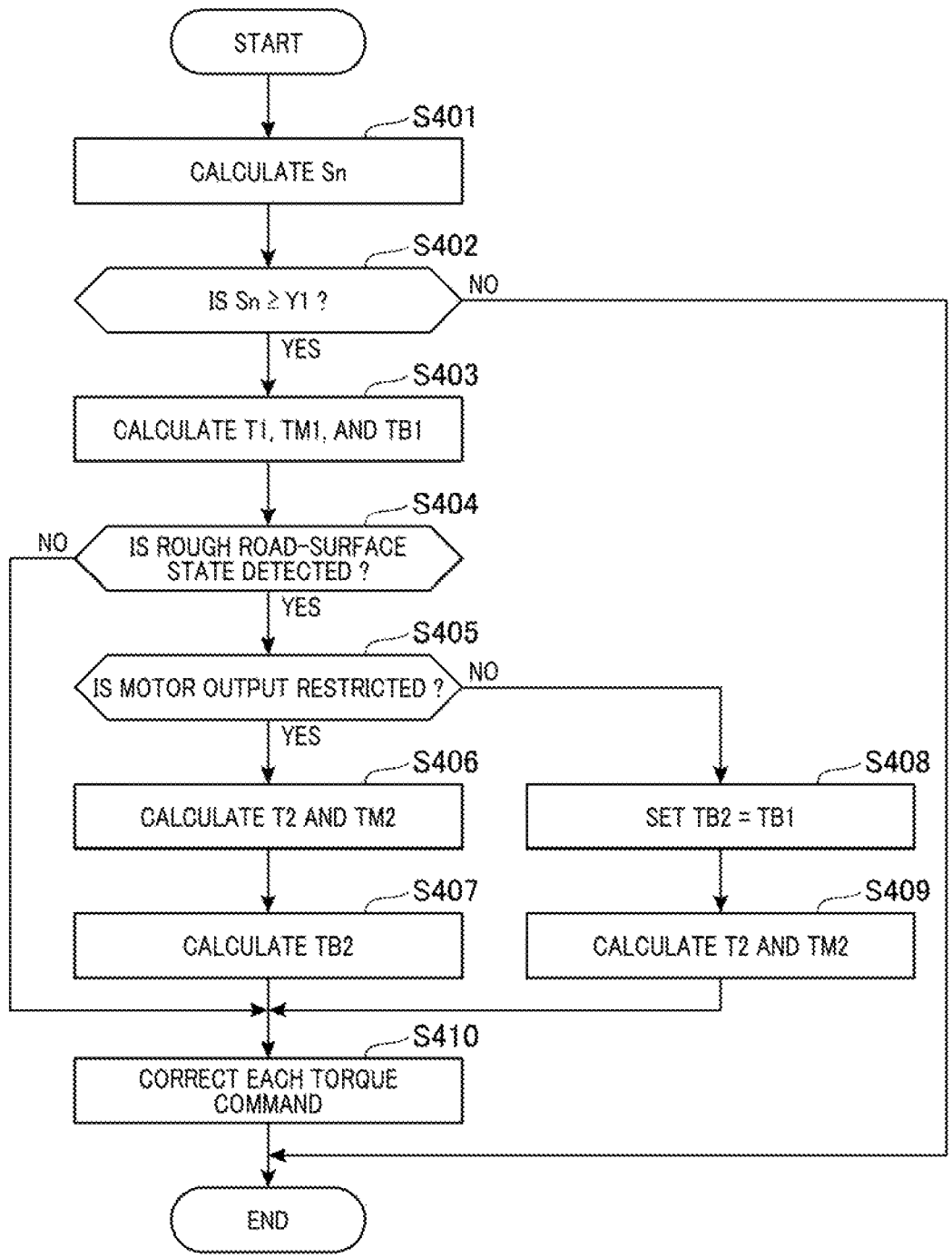
FIG. 7 is a flowchart of a drive control process according to a fourth embodiment.

FIG. 7 shows a flowchart of the drive control process according to a fourth embodiment. The processes at steps S401 to S404 shown in FIG. 6 are similar to those at steps S101 to S104 shown in FIG. 3. Therefore, descriptions thereof are omitted.

When determined that the road-surface state is rough at step S404, the ECU 40 proceeds to step S405. Meanwhile, when determined that the road-surface state is smooth at step S404, the ECU 40 proceeds to step S410.

At step S405, the ECU 40 determines whether or not the outputs of the MGs 12 and 13 are restricted. For example, the outputs of the MGs 12 and 13 may be restricted when the temperature or the SOC of the battery 11 or the temperatures of the MGs 12 and 13 are inappropriate. When determined that the outputs of the MGs 12 and 13 are restricted at step S405, the ECU 40 proceeds to step S406. Meanwhile, when determined that the outputs of the MGs 12 and 13 are not restricted at step S405, the ECU 40 proceeds to step S408.

At step S406, in a manner similar to that at step S105, the ECU 40 calculates the correction amount T2 of the drive torque T. The ECU 40 also calculates the correction amount TM2 of the motor torque TM and based on the output restrictions on the MGs 12 and 13.

Specifically, for example, when the SOC of the battery 11 is not sufficiently high, the ECU 40 calculates an upper limit value of electric power that can be supplied to the MGs 12 and 13 from the battery 11 based on the SOC of the battery 11. The ECU 40 then calculates a limit value L of the correction value TM2 of the motor torque TM of the MGs 12 and 13 based on the upper limit value of electric power that can be supplied.

When the correction amount T2 can be secured by the limit value L, the ECU 40 calculates the value of the correction amount TM2 corresponding to the correction amount T2. When the correction amount T2 cannot be secured by the limit value L, the ECU 40 sets the limit value L as a calculation value of the correction amount TM2.

After step S406, the ECU 40 proceeds to step S407. The ECU 40 calculates the correction amount TB2 of the brake torque TB based on expression (4), above. The ECU 40 adjusts the correction amount TB2 of the brake torque TB only when the correction amount T2 of the drive torque T cannot be secured by the correction amount TM2 of the motor torque TM.

For example, when the torque that increases as a result of the correction amount of the drive torque T being adjusted to the correction amount T2 is higher than the torque that increases as a result of the correction mount of the motor torque TM being adjusted to the correction amount TM2, the ECU 40 adjusts the correction amount of the brake torque TB to the correction amount TB2 by an amount corresponding to the amount of increase of the torque that is insufficient. Subsequently, the ECU 40 proceeds to step S410.

At step S408, the ECU 40 determines that the correction amount TB1 of the brake torque TB is not changed. That is, the ECU 40 sets TB2=TB1. Subsequently, the ECU 40 proceeds to step S409. At step S409, the ECU 40 calculates the correction amount T2 of the drive torque T. The ECU 40 also calculates the correction amount TM2 of the motor torque TM such that TB2=TB1 is met, based on expression (4), above.

At step S410, the ECU 40 corrects the torque commands of the drive torque T, the motor torque TM, and the brake torque TB based on the calculated correction amounts. When the outputs of the MGs 12 and 13 are not restricted, the drive torque T can be corrected by the motor torque TM that has high responsiveness being corrected. Therefore, a highly accurate slip suppression that is capable of promptly responding to the road-surface state can be performed.

Fifth Embodiment

Figure 8:
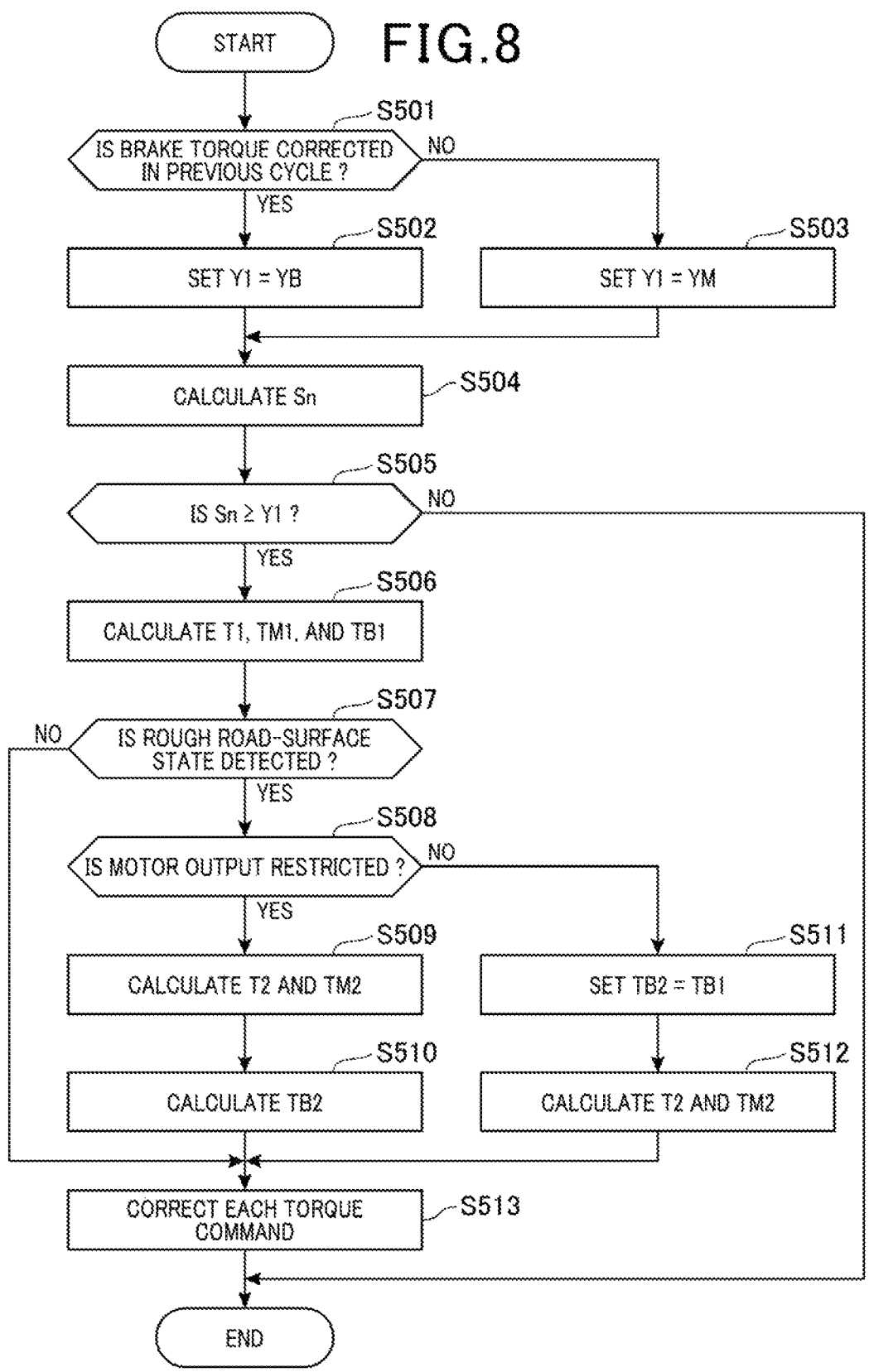
FIG. 8 is a flowchart of a drive control process according to a fifth embodiment.

FIG. 8 shows a flowchart of the drive control process according to a fifth embodiment.

The flowchart shown in FIG. 8 differs from the flowchart shown in FIG. 7 in that the slip determination value Y used at step S505 can be adjusted as appropriate by the processes at steps S501 to S503. The processes at steps S504 to S513 shown in FIG. 8 correspond to the processes at steps S401 to S410 shown in FIG. 7. Therefore, descriptions thereof are omitted.

At step S501, the ECU 40 determines whether or not the brake torque TB is corrected when the drive torque T is corrected at a previous cycle. When determined that the brake torque TB is corrected, the ECU 40 proceeds to step S502. The ECU 40 sets the slip determination value Y1 to Y=YB. When determined that the brake torque TB is not corrected, the ECU 40 proceeds to step S503. The ECU 40 sets the slip determination value Y1 to Y=YM.

The slip rate Sn at which slip suppression is started increases as the slip determination value Y1 increases. Therefore, high responsiveness is required during slip suppression control. The slip determination value YM is set to be higher as the responsiveness of the motor torque TM increases. The slip determination value YB is set to be higher as the responsiveness of the brake torque TB increases. In addition, because the motor torque TM is superior to the brake torque TB in terms of responsiveness, YM>YB.

As described above, according to the present embodiment, the determination value YB is used as the slip determination value Y1 when the brake torque TB is corrected. The determination value YM is used as the slip determination value Y1 when the motor torque TM is corrected. The motor torque TM is superior to the brake torque TB in terms of responsiveness. Therefore, the slip determination value Y1 is set to be higher when the motor torque TM is corrected, compared to when the brake torque TB is corrected. As a result of the slip determination value Y1 being set to a higher value, the start of the slip suppression process in which the drive torque T is reduced can be suppressed.

Sixth Embodiment

Figure 9:
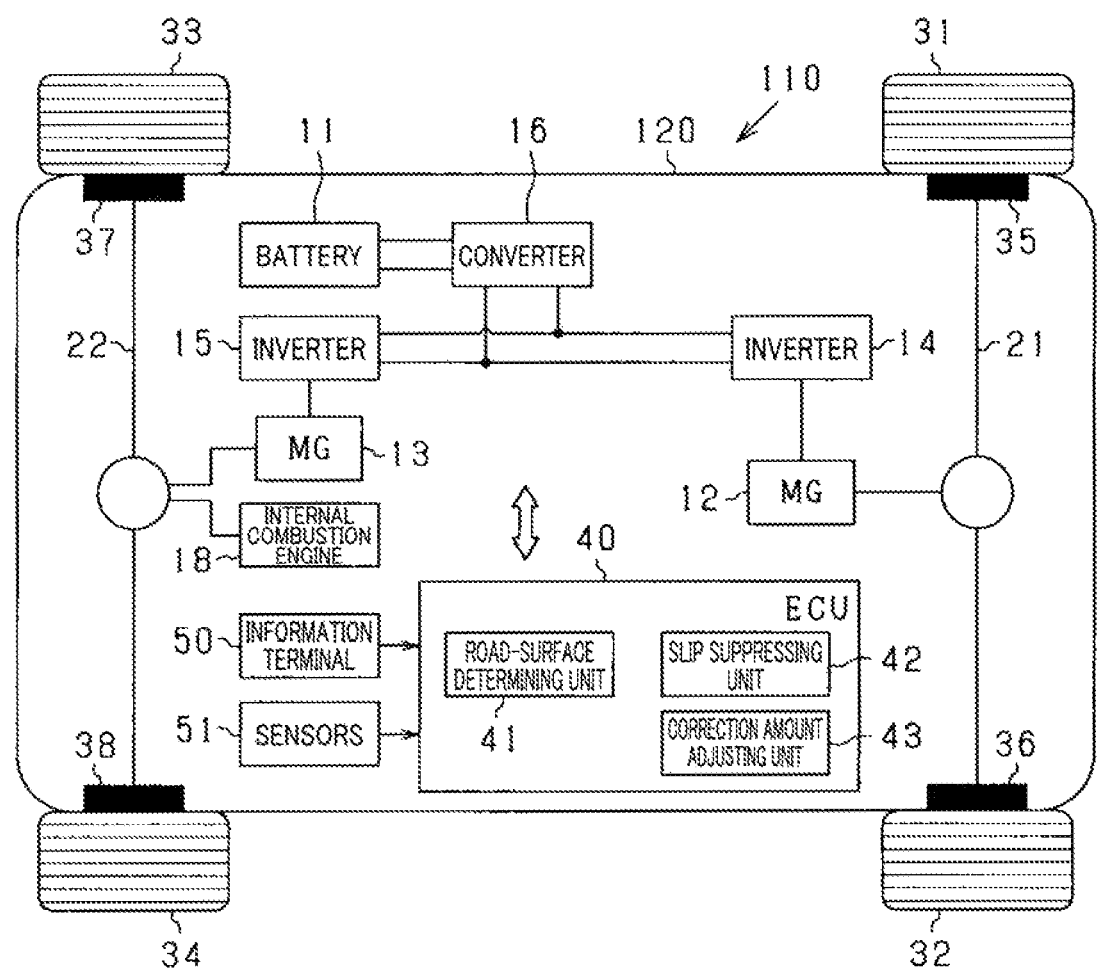
FIG. 9 is a schematic diagram of a drive system that is controlled by a drive control apparatus according to a sixth embodiment.

FIG. 9 shows a drive system 110 of a vehicle 120 according to a sixth embodiment. The drive system 110 differs from the drive system 10 shown in FIG. 1 in that the drive system 110 is mounted to a vehicle 120 that is a hybrid car (hybrid electric vehicle [HEV], and also includes an internal combustion engine 18. The internal combustion engine 18 is an engine. The internal combustion engine is drivably connected to the second drive shaft 22, together with the second MG 13. Other configurations are similar to those in FIG. 1. Descriptions thereof are omitted through use of the same reference numbers.

When the ECU 40 is applied to the drive system 110, in addition to the motor torque TM and the brake torque TB, an internal combustion torque TE is included in the torque elements that affect the drive torque T. The internal combustion torque TE is an output shaft torque when an output shaft of the internal combustion engine 18 rotates.

As shown in expression (5), below, the drive torque T is calculated as a sum of the product of the gear ratio kB and the brake torque TB, the product of the gear ratio kM and the motor torque TM, and a product of a gear ratio kE and the internal combustion torque TE. Here, the gear ratio kE is a gear ratio of the second drive shaft 22 in relation to the output shaft of the internal combustion engine 18.

In addition, the slip suppressing unit 42 also calculates a correction amount TE1 of the internal combustion torque TE based on expression (6), below, during slip suppression. The correction amount adjusting unit 43 also calculates a correction amount TE2 of the internal combustion torque TE based on expression (7), below, when the correction amount T1 is adjusted to the correction amount T2.

$$T = kB \times TB + kM \times TM + kE \times TE \quad (5)$$

$$T1 = kB \times TB1 + kM \times TM1 + kE \times TE1 \quad (6)$$

$$T2 = kB \times TB2 + kM \times TM2 + kE \times TE2 \quad (7)$$

Figure 10:
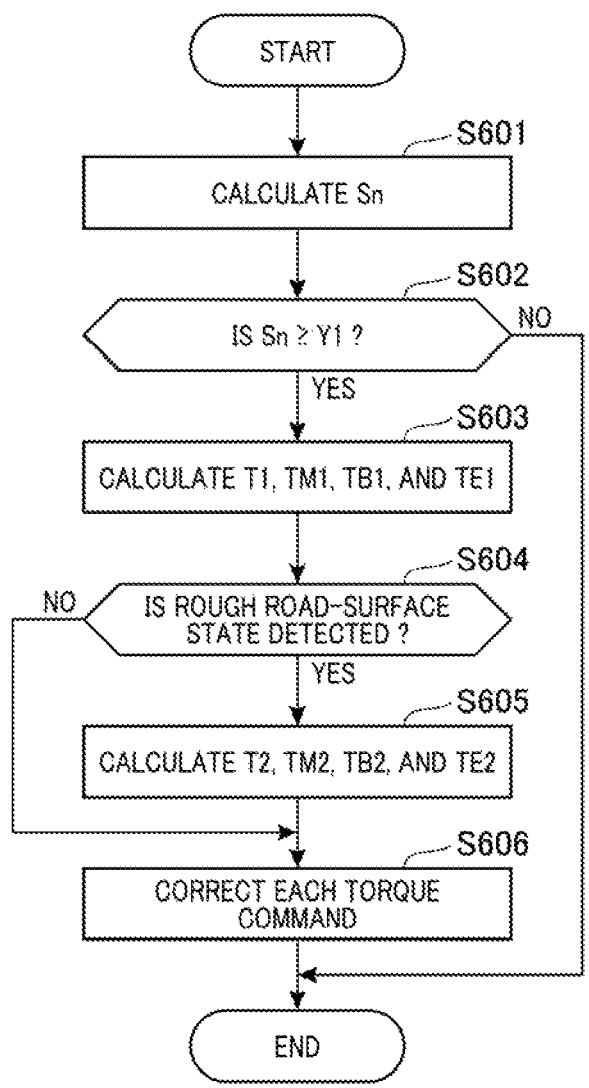
FIG. 10 is a flowchart of a drive control process according to the sixth embodiment.

FIG. 10 shows a flowchart of the drive control process according to the sixth embodiment. The processes at steps S601, S602, S604, and S606 shown in FIG. 10 are similar to those at steps S101, S102, S104, and S106 shown in FIG. 3. Therefore, descriptions thereof are omitted by the step numbers in the 100s being read as step numbers in the 600s.

In FIG. 10, at step S603, the ECU 40 calculates the correction amount T1 of the drive torque T. The ECU 40 also calculates the correction amount TM1 of the motor torque TM, the correction amount TB1 of the brake torque TB, and the correction amount TE1 of the internal combustion torque TE, based on expression (6), above. The motor torque TM is superior to the internal combustion torque TE in terms of responsiveness. Therefore, at this time, the ECU 40 adjusts the correction amount TM1 of the motor torque TM with higher priority than the correction amount TB1 of the brake torque TB and the correction amount TE1 of the internal combustion torque TE.

At step S605, the ECU 40 calculates the correction amount T3 of the drive torque T. The ECU 40 also calculates the correction amount TM2 of the motor torque TM, the correction amount TB2 of the brake torque TB, and the correction amount TE2 of the internal combustion torque TE, based on expression (7), above. At this time, the ECU 40 corrects the motor torque TM with higher priority than the brake torque TB and the internal combustion torque TE.

According to the embodiments described above, the following effects can be achieved.

The ECU 40 includes the road surface determining unit 41, the slip suppressing unit 42, and the correction amount adjusting unit 43. The road surface determining unit 41 determines the road-surface state of the travel road of the vehicles 20 and 120. The slip suppressing unit 42 suppresses slipping of the vehicles 20 and 120 by correcting the drive torque T that drives the drive shafts 21 and 22 of the wheels 31 to 34. The correction amount adjusting unit 43 reduces the correction amount T1 of the drive torque T to the correction amount T2 by adjusting the motor torque TM with higher priority than the brake torque TB and the internal combustion torque TE, in response to the road surface determining unit 41 determining that the road-surface state is rough.

As a result of the ECU 40, because the motor torque TM that has high responsiveness is adjusted with higher priority, drive torque correction that is highly capable of tracking the road-surface state of the travel road can be actualized. Slip suppression that is appropriate for the road-surface state can be performed.

In addition, the road surface determining unit 41 calculates the degree of roughness of the road-surface state. The correction amount adjusting unknit 43 adjusts the correction amount T1 of the drive torque T to T2 based on the calculated degree of roughness. As a result of the ECU 40, the correction amount of the drive torque T can be appropriately adjusted based on the degree of roughness. Therefore, drive torque correction that is even more highly capable of tracking the road-surface state of the travel road can be actualized. Slip suppression that is more appropriate for the road-surface state can be performed.

Furthermore, the slip suppressing unit 40 determines that the drive torque T is to be corrected when the slip rate Sn of the vehicles 20 and 120 is equal to or greater than the predetermined slip determination value Y1. Regarding the slip determination value Y1, the slip suppressing unit 42 sets Y1=YM when the motor torque TM is to be corrected. The slip suppressing unit 42 sets the slip determination value Y1 to Y1=YB (<YM) when the brake torque TB is to be corrected.

As a result of the ECU 40, when the motor torque TM that has high responsiveness is corrected, the drive torque T can be promptly controlled to a desired value when necessary. Therefore, slip suppression can not be performed until a state in which the slip rate Sn is high.

Moreover, when a determination that the vehicle 20 will accelerate is made, the correction amount adjusting unit 43 adjusts the correction amount T1 of the drive torque T to the correction amount T2. Meanwhile when a prediction that the vehicle 20 will not accelerate is made, the correction amount adjusting unit 43 does not adjust the correction amount T1 of the drive torque T. As a result of the ECU 40, driver discomfort can be suppressed. Safety while traveling can be improved.

The correction amount adjusting unit 43 adjusts the correction amount of the brake torque TB in response to the outputs of the MGs 12 and 13 being restricted. When the outputs of the MGs 12 and 13 are not restricted, the drive torque T can be corrected by the motor torque TM that has high responsiveness being corrected. Therefore, a highly accurate slip suppression that is capable of promptly responding to the road-surface state can be performed.

What is claimed is:

1. A drive control apparatus for a drive system that is mounted to a vehicle, drives wheels of the vehicle by a motor, and brakes the wheels by a brake apparatus, the drive control apparatus comprising:
    an electronic control unit (ECU) configured to:
        determine a road-surface state of a travel road of the vehicle, based on (i) a detected value of a travelling state of the vehicle or a detected value of a road-surface state of a travel road of the vehicle, and (ii) a predetermined determination value;
        suppress slipping of the vehicle by correcting a drive torque that drives a drive shaft of the wheels by correcting at least either of a motor torque with which the motor drives the wheels and a brake torque with which the brake apparatus brakes the wheels; and
        after determining that the drive torque is to be corrected, adjust a correction amount of the drive torque by adjusting the motor torque with higher priority than the brake torque in response to determining that the road-surface state is rough based on the detected value and the predetermined determination value.

2. The drive control apparatus according to claim 1, wherein the ECU is further configured to:
    calculate a degree of roughness of the road-surface state; and
    adjust the correction amount of the drive torque based on the degree of roughness.

3. The drive control apparatus according to claim 2, wherein the ECU is further configured to adjust the correction amount of the drive torque when the ECU determines that the vehicle will accelerate.

4. The drive control apparatus according to claim 3, wherein the ECU is further configured to adjust a correction amount of the brake torque in response to output of the motor being restricted.

5. The drive control apparatus according to claim 4, wherein the ECU is further configured to:
    determine that the drive torque is to be corrected when a slip rate of the vehicle is equal to or greater than a predetermined slip determination value, and
    set the slip determination value to a higher value when the motor torque is corrected, compared to when the brake torque is corrected.

6. The drive control apparatus according to claim 5, wherein:
    the drive system further includes an internal combustion engine that drives the wheels; and
    the ECU is further configured to adjust at least any one of the brake torque, the motor torque, and an internal combustion torque of the internal combustion engine.

7. The drive control apparatus according to claim 1, wherein the ECU is further configured to correct only the motor torque.

8. The drive control apparatus according to claim 1, wherein the ECU is further configured to correct only the brake torque.

9. The drive control apparatus according to claim 1, wherein the CU is further configured to adjust the correction amount of the drive torque when the ECU determines that the vehicle will accelerate.

10. The drive control apparatus according to claim 1, wherein the ECU is further configured to adjust a correction amount of the brake torque in response to output of the motor being restricted.

11. The drive control apparatus according to claim 1, wherein the ECU is further configured to:
    determine that the drive torque is to be corrected when a slip rate of the vehicle is equal to or greater than a predetermined slip determination value, and
    set the slip determination value to a higher value when the motor torque is corrected, compared to when the brake torque is corrected.

12. The drive control apparatus according to claim 3, wherein:
    the drive system further includes an internal combustion engine that drives the wheels; and
    the ECU is further configured to adjust at least any one of the brake torque, the motor torque, and an internal combustion torque of the internal combustion engine.

13. A drive system that is mounted to a vehicle, the drive system comprising:
    a motor that drives wheels of the vehicle;
    a brake apparatus that brakes the wheels; and
    a drive control apparatus including an electronic control unit (ECU) configured to:
        determine a road-surface state of a travel road of the vehicle based on (i) a detected value of a travelling state of the vehicle or a detected value of a road-surface state of a travel road of the vehicle, and (ii) a predetermined determination value;
        suppress slipping of the vehicle by correcting a drive torque that drives a drive shaft of the wheels by correcting at least either of a motor torque with which the motor drives the wheels and a brake torque with which the brake apparatus brakes the wheels; and
        after determining that the drive torque is to be corrected, adjust a correction amount of the drive torque by adjusting the motor torque with higher priority than the brake torque when determined that the road-surface state is rough based on the detected value and the predetermined determination value.

14. A drive control method for a drive system that is mounted to a vehicle, drives wheels of the vehicle by a motor, and brakes the wheels by a brake apparatus, the drive control method comprising:

determining, by an electronic control unit (ECU) included in a drive control apparatus provided in the drive system, a road-surface state of a travel road of the vehicle, based on (i) a detected value of a travelling state of the vehicle or a detected value of a road-surface state of a travel road of the vehicle, and (ii) a predetermined determination value;

suppressing, by the ECU, slipping of the vehicle by correcting a drive torque that drives a drive shaft of the wheels by correcting at least either of a motor torque with which the motor drives the wheels and a brake torque with which the brake apparatus brakes the wheels; and when the ECU determines that the drive torque is to be corrected, adjust a correction amount of the drive torque by adjusting the motor torque with higher priority than the brake torque in response to the ECU determining that the road-surface state is rough based on the detected value and the predetermined determination value.

* * * * *